United States Patent
Krofchak et al.

(10) Patent No.: US 6,440,194 B1
(45) Date of Patent: Aug. 27, 2002

(54) RECOVERY OF PRECIOUS METALS FROM METAL ALLOYS PRODUCED ALUMINOTHERMICALLY FROM BASE METAL SMELTER SLAG

(75) Inventors: David Krofchak, Copper Cliff; Roberto Berardi, Sudbury, both of (CA)

(73) Assignee: Fenicem Minerals Inc., Copper Cliff (CA)

( * ) Notice: Subject to any disclaimer, the term of this patent is extended or adjusted under 35 U.S.C. 154(b) by 0 days.

(21) Appl. No.: 09/716,425

(22) Filed: Nov. 21, 2000

(51) Int. Cl.[7] .............. C22B 3/08; C22B 11/00
(52) U.S. Cl. .............. 75/421; 75/741; 423/37; 423/43; 423/150.3
(58) Field of Search ............. 75/421, 741; 423/37, 423/43, 150.3

(56) References Cited

U.S. PATENT DOCUMENTS

| | | | | |
|---|---|---|---|---|
| 1,047,825 A | * | 12/1912 | McKechnie et al. | 423/141 |
| 2,352,096 A | * | 6/1944 | Hay | 423/101 |
| 3,891,522 A | * | 6/1975 | McKay et al. | 205/584 |
| 4,006,216 A | * | 2/1977 | Ettel et al. | 423/140 |
| 4,452,762 A | * | 6/1984 | Fugleberg et al. | 423/1 |
| 4,571,262 A | * | 2/1986 | Kerfoot et al. | 205/584 |
| 4,588,572 A | * | 5/1986 | Vincler et al. | 423/144 |
| 5,865,872 A | * | 2/1999 | Krofchak et al. | 420/590 |

FOREIGN PATENT DOCUMENTS

ZA    963438    *  4/1996

* cited by examiner

Primary Examiner—Roy King
Assistant Examiner—Tima McGuthry Banks
(74) Attorney, Agent, or Firm—Robert F. Delbridge

(57) ABSTRACT

A method of recovering precious metals from metal alloys produced aluminothermically from base metal smelter slag, includes treating the metal alloy with aqueous sulphuric acid solution having a pH of not greater than about 2 to cause dissolution of nickel and/or cobalt and iron and to cause formation of hydrogen sulfide which reacts with copper in the metal alloy to form a copper sulfide precipitate containing at least one precious metal, and separating the copper sulphide precipitate containing at least one precious metal from the remaining solution containing cobalt sulphate and/or nickel sulphate and ferrous sulphate.

2 Claims, 1 Drawing Sheet

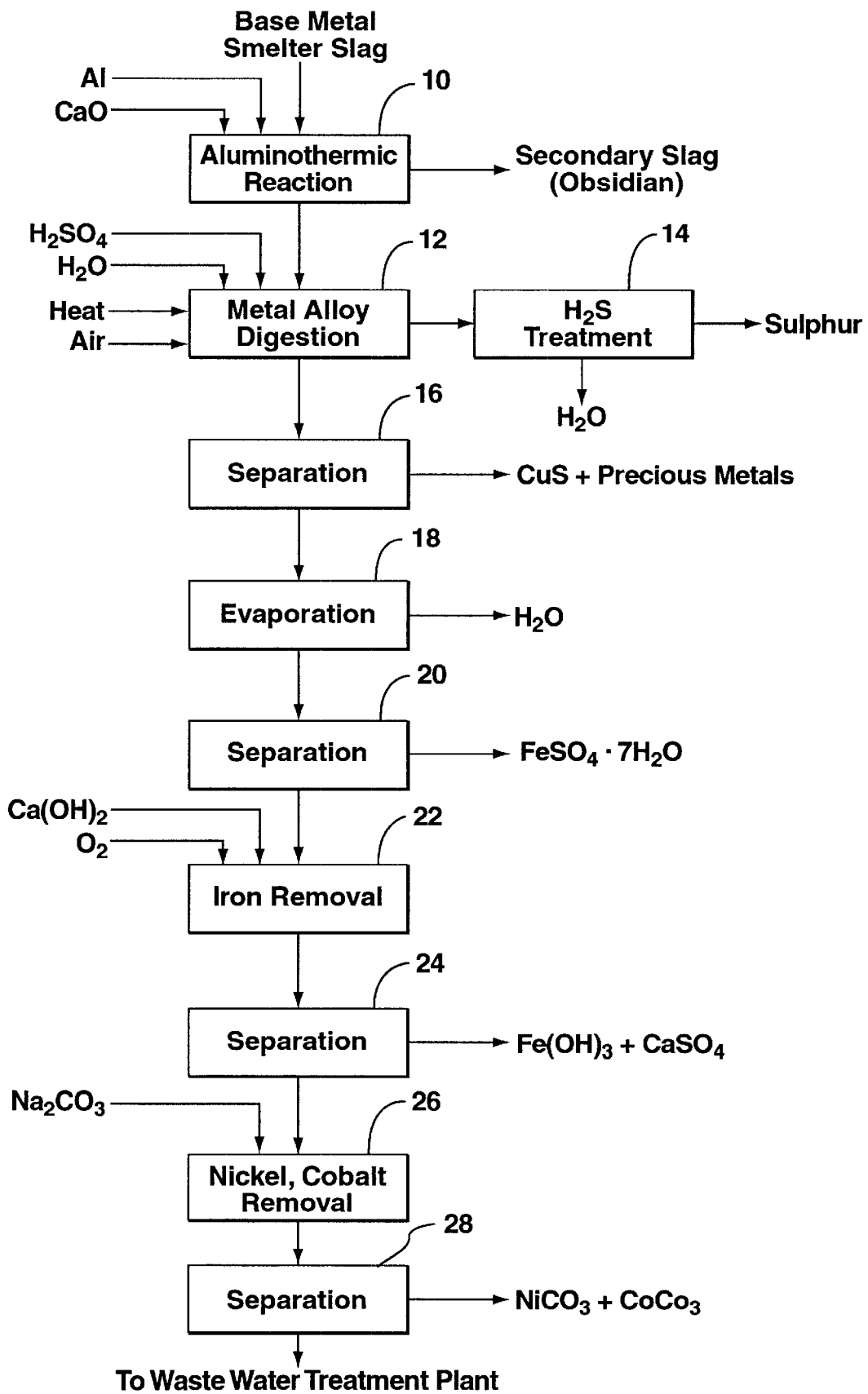

RECOVERY OF PRECIOUS METALS FROM METAL ALLOYS PRODUCED ALUMINOTHERMICALLY FROM BASE METAL SMELTER SLAG

This invention relates to the recovery of precious metals from metal alloys produced aluminothermically from base metal smelter slag.

BACKGROUND OF THE INVENTION

U.S. Pat. No. 5,865,872 (Krofchak et al) describes a method of recovering metals and producing a secondary slag from base metal smelter slag by means of an aluminothermic reaction. In addition to the secondary slag, the reaction produces a metal alloy containing copper, nickel and/or cobalt, iron and sulphur. The contents of the aforementioned U.S. patent is hereby incorporated herein by reference. A base metal smelter slag may include (by weight) the following:

from about 10% to about 50% $SiO_2$,
from about 0.5% to about 10% $Al_2O_3$,
from about 25% to about 50% Fe,
from about 0.5% to about 20% CaO,
from about 0.5% to about 15% MgO,
from about 0.1% to about 15% Cu,
from about 0.1% to about 15% Ni,
from about 0.1% to about 7% Co,
from about 0.1% to about 3% S A metal alloy produced in accordance with the method described in the aforementioned patent may include (by weight):

from about 2.5% to about 99% Fe.
from about 0.1% to about 10% Si,
from about 0.1% to about 25% Ni,
from about 0.2% to about 25% Cu.
from about 0.1% to about 10% Co,
from about 0.1% to about 25% S A base metal smelter slag may also include precious metals as follows (by weight):

from about 0.01 oz/ton to about 5 oz/ton Ag,
from about 0.01 oz/ton to about 3 oz/ton Pt,
from about 0.01 oz/ton to about 3 oz/ton Pd,
from about 0.01 oz/ton to about 3 oz/ton Au,
from about 0.01 oz/ton to about 3 oz/ton Rh Accordingly, a metal alloy produced from a base metal smelter slag containing precious metals in accordance with the method described in the aforementioned patent may also contain precious metals (by weight) as follows:

from about 0.02 oz/ton to about 10 oz/ton Ag,
from about 0.02 oz/ton to about 6 oz/ton Pt,
from about 0.02 oz/ton to about 6 oz/ton Pd.
from about 0.02 oz/ton to about 6 oz/ton Au,
from about 0.02 oz/ton to about 6oz/ton Rh It is therefore an object of the invention to provide a method of recovering at least one precious metal from a metal alloy produced aluminothermically from a base metal smelter slag.

SUMMARY OF INVENTION

The preset invention is based on the discovery that, if such a metal alloy is treated with aqueous sulphuric acid solution having a pH which does not exceed about 2, nickel and/or cobalt and iron is dissolved with the formation of hydrogen sulphide which reacts with copper in the metal alloy to form a copper sulphide precipitate which contains at least one precious metal, so that the precipitate can be easily separated from the remaining solution which contains cobalt sulphate and/or nickel sulphate and ferrous sulphate. The copper sulphide precipitate containing the at least one precious metal can then be treated to recover the precious metal.

The remaining solution may be subjected to an evaporation step to cause crystallizing of ferrous sulphate as a hydrate, and removing the crystallized ferrous sulphate therefrom to produce a further remaining solution containing cobalt sulphate and/nickel sulphate and any remaining ferrous sulphate.

The pH of the further remaining solution may be raised to about 3.5 and converting the ferrous iron to ferric iron to cause precipitation of iron as ferric hydroxide and removing the precipitated ferric hydroxide from the cobalt sulphate and/or nickel sulphate containing solution.

The pH of the nickel sulphate and/or cobalt sulphate containing solution may be raised to at least 9 with sodium carbonate and/or nickel sulphate containing solution to at least about 9 with sodium carbonate to precipitate cobalt sulphate and/or nickel sulphate as cobalt carbonate and/or nickel carbonate, and removing the precipitated cobalt carbonate and/or nickel carbonate from the still remaining solution.

BRIEF DESCRIPTION OF THE DRAWING

One embodiment of the invention will now be described with reference to the accompanying drawing which is a flow chart showing base metal smelter slag being subjected to an aluminothermic reaction, with the resultant metal alloy being treated in accordance with the invention.

DESCRIPTION OF PREFERRED EMBODIMENT

Referring to the drawing, base metal smelter slag containing copper, nickel, cobalt, iron and sulphur as well as previous metals is subjected to all aluminothermic reaction step 10 as described in aforementioned U.S. Pat. No. 5,865,872 to produce a secondary slag and a metal alloy containing copper, nickel, cobalt, iron, sulphur and precious metals. The secondary slag is separated from the metal alloy and utilized in a cement plant. The metal alloy is passed through a dissolution step 12 where the metal alloy is digested in sulphuric acid solution with a pH not greater than about 2, with some air and heat being supplied.

In the solution step 12, iron, nickel and cobalt go into solution and hydrogen sulphide is formed. Copper in the metal allow reacts with the hydrogen sulphide to form a copper sulphide precipitate which also contains precious metals. Excess hydrogen sulphide is expelled as a gas which is collected and subjected to a treatment step 14 to produce elemental sulphur and water.

The copper sulphide precipitate containing precious metals is separated from the nickel cobalt and iron containing solution in a separating step 16, and is treated in a refinery for recovery of the precious metals. The nickel cobalt and iron containing solution is passed to a crystallization step 18 where water is evaporated to cause crystallization of iron sulphate as ferrous sulphate heptahydrate, which is separated from the remaining solution in a separation step 20. The remaining solution containing, nickel sulphate, cobalt sulphate and some remaining ferrous sulphate is passed to an iron removal step 20 where remaining iron is precipitated as ferric hydroxide by addition of lime to raise the pH to about 3.5 and by addition of oxygen to convert ferrous iron to ferric iron by a redox process. Precipitated ferric hydroxide and calcium sulphate are separated from the remaining cobalt sulphate and nickel sulphate in a separation step 22 as a sludge for disposal.

The remaining cobalt sulphate and nickel sulphate solution is passed to a nickel and cobalt precipitation step 24 where the cobalt and nickel are precipitated as cobalt carbonate and nickel carbonate by addition of sodium carbonate to raise the pH to at least about 9. The cobalt carbonate and nickel carbonate precipitate is recovered in a separation step 26, and the remaining water is passed to a waste water treatment plant.

Examples of the invention will now be described.

EXAMPLE 1

A sample of rich base metal smelter slag was obtained, which has been segregated from a slag heap that has been accumulated over 50 years from one of the largest nickel producers located in Sudbury, Ontario, Canada. 800 grams of the sample were crushed to 1 mm (100% passing 18 mesh sieve) and mixed with 80 gams of Al metal (100% passing 20 mesh sieve) and 160 g of CaO (¼" chips). The charge was put in a crucible lined with alumina and crucible inside a propane fired drum furnace. The furnace was then heated for 1 hour to about 1300° C. After 1 hour the Al reacted with the metal oxides contained in the slag and the aluminothermic reaction lasted a few minutes. The material was then poured into a cast iron mold to allow cooling and separation of the new two phases, the metal alloy and the new slag, that has been identified as obsidian. Samples of the original slag, metal alloy and obsidian were sent for analysis.

The results were as follows:

|  | Slag | Al | CaO | Crucible | Total | Total | Metal Alloy | Obsidian |
|---|---|---|---|---|---|---|---|---|
| Before | 800 | 80 | 160 | 1090.9 | 2130.9 |  |  |  |
| After |  |  |  |  |  | 2127.4 99.8% | 417.3 | 619.2 |

| MASS BALANCE | | | | | | | | | | |
|---|---|---|---|---|---|---|---|---|---|---|
| | Input | | | | Output (%) | | Mass Out (g) | | Distribution (%) | |
| | Slag | Al | CaO | Mass In (g) | Metal Weight (g) | Obsidian | Metal | Obsidian | Metal | Obsidian |
| | 800 | 80 | 160 | 1040 | 417.3 | 619.2 | 417.3 | 619.2 | | |
| Ni | 6.586 | | | 52.686 | 12.976 | 0.016 | 54.149 | 0.099 | 99.812 | 0.188 |
| Cu | 6.759 | | | 54.069 | 11.626 | 0.023 | 48.515 | 0.142 | 99.737 | 0.263 |
| Co | 0.395 | | | 3.163 | 0.766 | 0.003 | 3.197 | 0.020 | 99.374 | 0.626 |
| S | 8.024 | | | 64.194 | 11.710 | 0.544 | 48.866 | 3.368 | 94.753 | 5.247 |
| Fe | | | | | 57.301 | | 239.117 | | 69.116 | |
| FeO | 45.518 | | | 364.147 | | 6.022 | | 37.287 | | 10.240 |
| Si | | | | | 0.721 | | 3.009 | | 0.878 | |
| $SiO_2$ | 26.085 | | | 208.678 | | 33.068 | | 204.757 | | 98.121 |
| Al | | 80 | | 80.000 | 0.269 | | 1.121 | | 2.635 | |
| $Al_2O_3$ | 3.782 | | | 30.259 | | 27.850 | | 172.447 | | 95.019 |
| Ca | | | | | 0.157 | | 0.653 | | 7.506 | |
| CaO | 2.138 | | 160 | 177.103 | | 25.591 | | 158.459 | | 89.473 |
| Mg | | | | | 0.015 | | 0.061 | | −9.892 | |
| MgO | 1.691 | | | 13.527 | | 2.543 | | 15.746 | | 116.404 |

This example shows that the aluminothermic process is all efficient way of metal recovery, i.e. over 99% of Ni, Cu, and Co in the original slag reported to the metal alloy. Also, the new slag, identified as obsidian, is an environmentally clean glass material, which is an excellent supplementary cementing material.

Substantially all the precious metals in the original base metal smelter slag reported to the metal alloy.

Virtually no precious metals reported to the new slag (Pt.0.0042 oz/ton; Pd,0.0021 oz/ton; Rh,0.001 oz/ton; Ag-0.01.01 oz/ton).

EXAMPLE 2

200 g of the metal alloy from Example 1 were crushed to 1 mm (100% passing 18 mesh sieve) and dissolved in a beaker with 6,000 g sulfuric acid @ 10% solution (equal to 600 g sulfuric acid and 5,400 g of water). After the reaction was completed it was noted that an undissolved residue (U.R.) reported to the bottom of the beaker. The solution was then filtered and the filtrate washed, dried and weighed. Samples of the metal alloy, undissolved residue and solution were sent for analysis.

The results were as follows:

|        | Metal Alloy | $H_2SO_4$ | Water | Total | Total | U.R.         | Solution |
|--------|-------------|-----------|-------|-------|-------|--------------|----------|
| Before | 200         | 600       | 5400  | 6200  |       |              |          |
| After  |             |           |       |       | 6200  | 40.8 20.4%   | 6159.2   |

MASS BALANCE

|     | Input |           |       |                            | Output (%) |           | Mass Out (g) |          |              |          |
|-----|-------|-----------|-------|----------------------------|------------|-----------|--------------|----------|--------------|----------|
|     | Metal | $H_2SO_4$ | Water | Mass In (g) Weight (g)     | U.R.       | SOL (g/l) | U.R.         | Solution | Distribution (%) |      |
|     | 200   | 600       | 5400  | 6200                       | 40.8       | 1000      | 40.8         | 1000     | U.R.         | Solution |
| Ni  | 12.976 |          |       | 25.952                     | 5.486      | 20.936    | 2.238        | 20.936   | 8.625        | 91.375   |
| Cu  | 11.626 |          |       | 23.252                     | 57.347     | 0.002     | 23.398       | 0.002    | 100.626      | −0.626   |
| Co  | 0.766  |          |       | 1.532                      | 0.146      | 1.269     | 0.060        | 1.269    | 3.888        | 96.112   |
| S   | 11.710 | 181.4    |       | 204.820                    | 16.993     | 140.300   | 6.933        | 140.300  | 3.385        | 96.615   |
| Fe  | 57.301 |          |       | 114.602                    | 4.851      | 92.151    | 1.979        | 92.151   | 1.727        | 98.273   |
| Si  | 0.721  |          |       | 1.442                      | 0.923      | 0.663     | 0.377        | 0.663    | 26.115       | 73.885   |
| Al  | 0.269  |          |       | 0.537                      | 1.428      | 0.074     | 0.583        | 0.074    | 108.415      | −8.415   |
| Ca  | 0.157  |          |       | 0.313                      | 0.085      | 0.009     | 0.035        | 0.009    | 11.073       | 88.927   |
| Mg  | 0.015  |          |       | 0.029                      | 0.006      | 0.010     | 0.002        | 0.010    | 8.327        | 91.673   |
|     | oz/ton |          |       |                            | oz/ton     |           |              |          |              |          |
| Pt  | 0.219  |          |       | 0.0150                     | 1.017      |           | 0.0142       |          | 94.734       |          |
| Pd  | 0.195  |          |       | 0.0134                     | 0.922      |           | 0.0129       |          | 96.455       |          |
| Rh  | 0.021  |          |       | 0.0014                     | 0.099      |           | 0.0014       |          | 96.171       |          |
| Au  | 0.057  |          |       | 0.0039                     | 0.269      |           | 0.0038       |          | 96.274       |          |
| Ag  | 1.610  |          |       | 0.1104                     | 7.58       |           | 0.1060       |          | 96.045       |          |
| TPM (Pt + Pd + Au) | 0.470 | |     | 0.0322                     | 2.208      |           | 0.0309       |          | 95.837       |          |

This example shows that previous metals can be successfully recovered through acid dissolution in an undissolved residue composed mainly of copper sulfide, leaving in solution iron, nickel and cobalt sulfate.

EXAMPLE 3

1000 g of solution from Example 2 were heated in order to increase the concentration of ferrous sulfate. When it reached about ¼ of its original volume, it was cooled very rapidly to allow crystallization of ferrous sulfate heptahydrated ($FeSO_4$, $7H_2O$), leaving the nickel and the cobalt in solution. Then residual iron was removed through redox reaction of ferrous ($Fe^{II}$) to ferric ($Fe^{III}$) ions and precipitated out with PH increased to 3.5 with milk of lime—CaO. After iron removal, a solution of sodium carbonate was added to allow precipitation of nickel and cobalt carbonate. Samples of the solution, ferrous sulfate heptahydrated and nickel and cobalt carbonate were sent for analysis.

The results were as follows:

|        | Solution | CaO    | Na2CO3 | $FeSO_4 \cdot 7H_2O$ | (Ni, Co)$CO_3$ | Solution |
|--------|----------|--------|--------|----------------------|----------------|----------|
| Before | 1000 g   | excess | excess |                      |                |          |
| After  |          |        |        | 98 g                 | 235 g          | 250 g    |

MASS BALANCE

|    | Input |             | Output (%)       |                   |           | Mass Out (g)     |                   |       |                  |                   |       |
|----|-------|-------------|------------------|-------------------|-----------|------------------|-------------------|-------|------------------|-------------------|-------|
|    | Sol. (g/l) | Mass In (g) | Ferrous Sulfate | (Ni,Co) Carbonite | Sol. (g/l) | Ferrous Sulfate | (Ni,Co) Carbonate | Sol.  | Distribution (%) |                   |       |
|    |            |             | Weight (g)       |                   |           |                  |                   |       | Ferrous Sulfate  | (Ni,Co) Carbonate | Sol.  |
|    | 1000       | 1000        | 98               | 235               | 250       | 98               | 235               | 250   |                  |                   |       |
| Ni | 20.936     | 20.936      | 1.973            | 7.639             | 0.0680    | 1.934            | 17.952            | 0.272 | 9.235            | 90.765            | 1.299 |
| Cu | 0.002      | 0.002       | 0.031            | 0.026             | 0.0015    | 0.030            | 0.061             | 0.006 |                  |                   |       |
| Co | 1.269      | 1.269       | 0.203            | 0.321             | 0.0060    | 0.199            | 0.754             | 0.024 | 15.677           | 84.323            | 1.891 |
| S  | 140.300    | 140.300     | 11.440           | 0.220             | 5.5460    | 11.211           | 0.517             | 22.184| 7.991            | 0.368             | 15.846|
| Fe | 92.151     | 92.151      | 17.537           | 0.203             | 0.0082    | 17.186           | 0.477             | 0.084 | 18.650           | 0.518             | 0.091 |

-continued

| | | | | | | | | |
|---|---|---|---|---|---|---|---|---|
| Si | 0.663 | 0.663 | 0.014 | 0.017 | 0.0062 | 0.003 | 0.040 | 0.064 |
| Al | 0.074 | 0.074 | 0.011 | 0.017 | 0.0095 | 0.011 | 0.040 | 0.096 |
| Ca | 0.009 | 0.009 | 0.067 | 23.057 | 0.0094 | 0.066 | 54.184 | 0.096 |
| Mg | 0.010 | 0.010 | 0.005 | 2.287 | 0.3431 | 0.006 | 5.374 | 1.372 |
| | | | oz/ton | oz/ton | | | | |
| Pt | | | 0.0032 | 0.0041 | | | | |
| Pd | | | 0.0016 | 0.0020 | | | | |
| Rh | | | 0.0016 | 0.0020 | | | | |
| Au | | | 0.0008 | 0.0010 | | | | |
| Ag | | | 0.0100 | 0.0004 | | | | |
| TPM (Pt + Pd + Au) | | | 0.0056 | 0.0071 | | | | |

This method shows that nickel and cobalt can be successfully separated from iron producing valuable products, i.e. ferrous sulfate heptahydrate and nickel/cobalt carbonate. No precious metals were detected (already recovered in the undissolved residue of Example 2).

EXAMPLE 4

600 g of new slag from Example 1 were ground to 45 micron (100% passing –325 mesh sieve) and ASTM/CSA standard cubes were made using various ratio new slag:normal Portland cement type 10 to be test the uniaxial strength at 1, 3, 7, 28 and 90 days.

The results were as follows:

| | Mix Proportion in gm | | | | | | | |
|---|---|---|---|---|---|---|---|---|
| | Cement Type 10 | Silica Sand | New Slag | Water | \multicolumn{5}{c}{Compressive Strength in psi} |
| | | | | | 1 day | 3 day | 7 day | 28 day | 90 day |
| Control | 500 | 1375 | — | 242.5 | 1021 | 3920 | 4474 | 6181 | 7143 |
| #1 | 425 | 1375 | 75 | 242.5 | 1018 | 3768 | 4386 | 6065 | 7256 |
| #2 | 375 | 1375 | 125 | 242.5 | 880 | 2877 | 3707 | 7291 | 7489 |
| #3 | 325 | 1375 | 175 | 242.5 | 604 | 2912 | 4513 | 7535 | 8535 |
| #4 | 250 | 1375 | 250 | 242.5 | 470 | 2198 | 4132 | 7401 | 8033 |

From these results it is clear that the cubes made with the blend of the ground new slag normal Portland cement exceeded the control.

Besides, the Pozzolanic Strength Activity Index (P.S.A.I.) at 28 day has to be at least 75% of a control sample. The P.S.A.I. with Portland cement according to the ASTM Standards is calculated in the following manner:

Pozzolanic Strength Activity Index with Portland cement=$(A/B) \times 100$

Where:
A=average compressive strength of test mix cubes made with the blended cement
B=average compressive strength of control mix cubes

| | #1 | #2 | #3 | #4 |
|---|---|---|---|---|
| PSAI | 98% | 118% | 122% | 120 |

This example shows that the new slag after metal recovery produces an excellent supplementary cementing material.

Other embodiments and examples of the invention will now be readily apparent to those skilled in the art, the scope of the invention being defined in the appended claims.

What is claimed is:

1. A method of recovering precious metals from metal alloys produced aluminothermically from base metal smelter slag, said base metal smelter slag containing copper, nickel and/or cobalt, iron, sulphur and at least one precious metal, whereby said metal alloy also contains copper, nickel and/or cobalt, and, sulphur and said at least one precious metal, said method including:

treating the metal alloy with aqueous sulphuric acid solution having a pH of not greater than about 2 to cause dissolution of nickel and/or cobalt and iron and to cause formation of hydrogen sulfide which reacts with copper in the metal alloy to form a copper sulfide precipitate containing at least one precious metal, and separating the copper sulphide precipitate containing at least one precious metal from the remaining solution containing cobalt sulphate and/or nickel sulphate and ferrous sulphate, subjecting the remaining solution to an evaporation step to cause crystallization of ferrous sulphate as a hydrate, and removing the crystallized ferrous sulphate therefrom to produce a further remaining solution containing cobalt sulphate and/nickel sulphate and any remaining ferrous sulphate and raising the pH of the further remaining solution to about 3.5 and converting the ferrous iron to ferric iron to cause precipitation of iron as ferric hydroxide and removing the precipitated ferric hydroxide from the cobalt sulphate and/or nickel sulphate containing solution.

2. A method according to claim 1 including raising the pH of the remaining cobalt sulphate and/or nickel sulphate containing solution to at least about 9 with sodium carbonate to precipitate cobalt sulphate and/or nickel sulphate as cobalt carbonate and/or nickel carbonate, and removing the precipitated cobalt carbonate and/or nickel carbonate from the still remaining solution.

\* \* \* \* \*